United States Patent
Urade et al.

(10) Patent No.: US 10,190,056 B2
(45) Date of Patent: Jan. 29, 2019

(54) CONVERSION OF SOLID BIOMASS INTO A LIQUID HYDROCARBON MATERIAL

(71) Applicant: SHELL OIL COMPANY, Houston, TX (US)

(72) Inventors: Vikrant Nanasaheb Urade, Bangalore (IN); Laxmi Narasimhan Chilkoor Soundararajan, Bangalore (IN); Srikant Gopal, Bengaluru (IN); Madhusudhan Rao Panchagnula, Bangalore (IN); Alan Anthony Del Paggio, Spring, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/319,040

(22) PCT Filed: Jun. 29, 2015

(86) PCT No.: PCT/EP2015/064732
§ 371 (c)(1),
(2) Date: Dec. 15, 2016

(87) PCT Pub. No.: WO2016/001163
PCT Pub. Date: Jan. 7, 2016

(65) Prior Publication Data
US 2017/0114283 A1  Apr. 27, 2017

(30) Foreign Application Priority Data
Jul. 1, 2014 (IN) .......................... 3235/CHE/2014

(51) Int. Cl.
*C07C 1/00* (2006.01)
*C10G 1/00* (2006.01)
(Continued)

(52) U.S. Cl.
CPC ............. *C10G 1/002* (2013.01); *C10G 1/06* (2013.01); *C10G 1/086* (2013.01); *C10G 1/10* (2013.01);
(Continued)

(58) Field of Classification Search
CPC .................................. C07C 1/00; C10G 1/00
(Continued)

(56) References Cited

U.S. PATENT DOCUMENTS 5,961,786 A    10/1999   Freel et al.
8,278,492 B2   10/2012   Myllyoja et al.
(Continued)

FOREIGN PATENT DOCUMENTS

CA    1283880    5/1991
EP    0998975    10/2000
(Continued)

OTHER PUBLICATIONS

Marker et al., "Integrated Hydropyrolysis and Hydroconversion Process for Production of Gasoline and Diesel Fuel from Biomass", Extended Abstracts 2009 AIChE, Jul. 31, 2005, pp. 1-11, XP002718084.
(Continued)

*Primary Examiner* — Thuan D Dang

(57) ABSTRACT

The present invention provides a process for producing liquid hydrocarbon products from a solid biomass feedstock, said process comprising the steps of:
a) providing in a first hydropyrolysis reactor vessel a first hydropyrolysis catalyst composition;
b) contacting the solid biomass feedstock with said first hydropyrolysis catalyst composition and molecular hydrogen in said first hydropyrolysis reactor vessel to produce a product stream comprising partially deoxygenated hydropyrolysis product, $H_2O$, $H_2$, $CO_2$, CO, $C_1$-$C_3$ gases, char and catalyst fines;
(Continued)

c) removing said char and catalyst fines from said product stream;
d) hydroconverting said partially deoxygenated hydropyrolysis product in a hydroconversion reactor vessel in the presence of one or more hydroconversion catalyst and of the $H_2O$, $CO_2$, CO, $H_2$, and $C_1$-$C_3$ gas generated in step a), to produce a vapor phase product comprising substantially fully deoxygenated hydrocarbon product, $H_2O$, CO, $CO_2$, and $C_1$-$C_3$ gases.

20 Claims, 3 Drawing Sheets

(51) Int. Cl.
*C10K 1/00* (2006.01)
*C10K 3/04* (2006.01)
*C10G 1/06* (2006.01)
*C10G 1/08* (2006.01)
*C10G 1/10* (2006.01)
*C10G 3/00* (2006.01)

(52) U.S. Cl.
CPC ............... *C10G 3/45* (2013.01); *C10G 3/46* (2013.01); *C10G 3/47* (2013.01); *C10G 3/48* (2013.01); *C10G 3/50* (2013.01); *C10G 3/52* (2013.01); *C10K 1/002* (2013.01); *C10K 1/004* (2013.01); *C10K 3/04* (2013.01); *C10G 2300/1003* (2013.01); *C10G 2300/1011* (2013.01); *C10G 2300/1014* (2013.01); *Y02P 30/20* (2015.11)

(58) Field of Classification Search
USPC ................... 585/240, 241, 242, 310
See application file for complete search history.

(56) References Cited

U.S. PATENT DOCUMENTS

| | | |
|---|---|---|
| 2002/0043483 A1 | 4/2002 | Leung et al. |
| 2008/0280754 A1 | 11/2008 | Toledo Antonio et al. |
| 2008/0308457 A1 | 12/2008 | Dindi et al. |
| 2010/0251615 A1 | 10/2010 | Marker et al. |
| 2011/0167713 A1 | 7/2011 | Quignard et al. |
| 2012/0260563 A1 | 10/2012 | Marker et al. |
| 2012/0317873 A1 | 12/2012 | Johnson et al. |
| 2013/0338412 A1 | 12/2013 | Marker et al. |
| 2014/0058182 A1 | 2/2014 | Sandstede et al. |
| 2014/0100395 A1 | 4/2014 | Felix et al. |

FOREIGN PATENT DOCUMENTS

| | | |
|---|---|---|
| EP | 1553157 | 7/2005 |
| WO | 8801611 A1 | 3/1988 |
| WO | 9856876 A1 | 12/1998 |
| WO | 2000077129 | 12/2000 |
| WO | 2010117437 | 10/2010 |
| WO | 2012162403 | 5/2013 |
| WO | 2013066808 | 5/2013 |
| WO | 2013074434 A1 | 5/2013 |
| WO | 2014001632 A1 | 1/2014 |
| WO | 2015114008 A1 | 8/2015 |

OTHER PUBLICATIONS

Viljava et al., Effect of H2S on the stability of CoMo/Al2O3 catalysts during hydrodeoxygenation, Catalysis Today, vol. 60, pp. 83-92 (2000).

CONVERSION OF SOLID BIOMASS INTO A LIQUID HYDROCARBON MATERIAL

PRIORITY CLAIM

The present application is the National Stage (§ 371) of International Application PCT/EP2015/064732, filed Jun. 29, 2015, which claims priority from Indian Patent Application No. 3235/CHE/2014, filed Jul. 1, 2014 incorporated herein by reference.

FIELD OF THE INVENTION

The invention relates to a process for converting a solid biomass material into a liquid hydrocarbon material suitable for use as a fuel or as a blending component in a fuel.

BACKGROUND OF THE INVENTION

With increasing demand for liquid transportation fuels, decreasing reserves of 'easy oil' (crude petroleum oil that can be accessed and recovered easily) and increasing constraints on carbon footprints of such fuels, it is becoming increasingly important to develop routes to produce liquid transportation fuels from biomass in an efficient manner. Such liquid transportation fuels produced from biomass are sometimes also referred to as biofuels. Biomass offers a source of renewable carbon. Therefore, when using such biofuels, it may be possible to achieve more sustainable $CO_2$ emissions over petroleum-derived fuels.

An efficient method for processing biomass into high quality liquid fuels (e.g. diesel fuel and gasoline) is described in WO 2010/117437 A1, in the name of Gas Technology Institute.

Solid feedstocks such as feedstocks containing waste plastics, feedstocks containing lignocellulose (e.g. woody biomass, agricultural residues, forestry residues, residues from the wood products and pulp & paper industries) and municipal solid waste containing lignocellulosic material, waste plastics or food waste are important feedstocks for biomass to fuel processes due to their availability on a large scale. Lignocellulose comprises a mixture of lignin, cellulose and hemicelluloses in any proportion and usually also contains ash and moisture.

Certain conventional hydroconversion catalysts used in biomass conversion, similar to those used in refining applications, are generally substantially fully sulfided, i.e. they contain near-stoichiometric quantities of sulphur (e.g. molybdenum is present substantially as $MoS_2$ and nickel is present substantially as NiS, etc). Some disclosures teach the need to continually introduce sulfur during biomass processing to maintain hydroconversion catalysts in their sulfided state (see, for example, U.S. Pat. No. 8,278,492). By substantially fully sulfided, it is understood that more than 95% of the metal atoms on the catalyst are in fully sulfided form. In conventional hydroconversion and refining processes, sulfidation procedures followed are designed to produce such substantially fully sulfided form of the active metal component of the catalyst.

It would an advantage to provide a wide range of catalysts adaptable to a broader range of biomass feedstocks for use in the process.

SUMMARY OF THE INVENTION

Accordingly, the present invention provides a process for producing liquid hydrocarbon products from a solid biomass feedstock, said process comprising the steps of:

a) providing in a first hydropyrolysis reactor vessel a first hydropyrolysis catalyst composition, said composition comprising one or more active metals selected from cobalt, molybdenum, nickel, tungsten, ruthenium, platinum, palladium, iridium and iron on an oxide support, wherein the active metals are present in a partially sulfided form to the extent that the first hydropyrolysis catalyst composition contains sulfur in an amount of from 10 to 90% of a full stoichiometric amount;

b) contacting the solid biomass feedstock with said first hydropyrolysis catalyst composition and molecular hydrogen in said first hydropyrolysis reactor vessel at a temperature in the range of from 350 to 600° C. and a pressure in the range of from 0.50 to 7.50 MPa, to produce a product stream comprising partially deoxygenated hydropyrolysis product, $H_2O$, $H_2$, $CO_2$, CO, $C_1$-$C_3$ gases, char and catalyst fines;

c) removing said char and catalyst fines from said product stream;

d) hydroconverting said partially deoxygenated hydropyrolysis product in a hydroconversion reactor vessel in the presence of one or more hydroconversion catalyst and of the $H_2O$, $CO_2$, CO, $H_2$, and $C_1$-$C_3$ gas generated in step a), to produce a vapour phase product comprising substantially fully deoxygenated hydrocarbon product, $H_2O$, CO, $CO_2$, and $C_1$-$C_3$ gases.

DETAILED DESCRIPTION OF THE INVENTION

Figure 1:
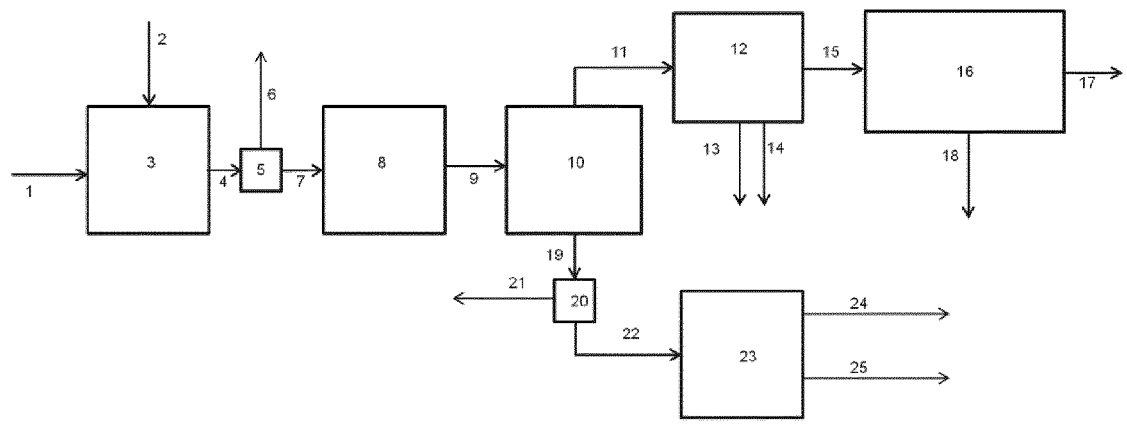
FIG. 1 shows a representation of one embodiment of the process of the invention.

A full stoichiometric amount of sulphur is the amount of sulphur that would be present if each of the active metals in a catalyst composition was in its most sulfided form, e.g. nickel would be present as NiS, molybdenum would be present as $MoS_2$. Ideally, a 'fully sulfided' catalyst composition suitable for hydroconversion and refining contains a full stoichiometric amount of sulphur. However, in practice, it would be understood that lower amounts such as greater than 95%, preferably greater than 98% may be present in a catalyst considered to be 'fully sulfided'. Such high degrees of sulfidation have been considered essential when using hydroconversion catalysts, especially those comprising cobalt, molybdenum, nickel, and tungsten on an oxide support.

However, the present inventors have found that an efficient and high yielding process for the conversion of solid biomass to liquid hydrocarbon can be achieved by using, in a first step, a supported metal catalyst in which the hydropyrolysis catalyst composition has been partially sulfided to the extent that it only contains sulfur in an amount of from 10 to 90% of a full stoichiometric amount when they are first contacted with the biomass feedstock and molecular hydrogen. Preferably, the hydropyrolysis catalyst composition has been partially sulfided to the extent that it only contains sulfur in an amount of at least 20% (e.g. from about 20% to about 90%) of a full stoichiometric amount. More preferably, the hydropyrolysis catalyst composition has been partially sulfided to the extent that it only contains sulfur in an amount of at least 30% (e.g. from about 30% to about 90%)

of a full stoichiometric amount. Even more preferably, the hydropyrolysis catalyst composition has been partially sulfided to the extent that it only contains sulfur in an amount of at least 50% (e.g. from about 50% to about 90%) of a full stoichiometric amount. Yet more preferably, the hydropyrolysis catalyst composition has been partially sulfided to the extent that it only contains sulfur in an amount of at least 70% of a full stoichiometric amount.

The hydropyrolysis catalyst compositions used in the process of the present invention comprise one or more active metals selected from cobalt, molybdenum, nickel, tungsten, ruthenium, platinum, palladium, iridium and iron. Preferably, the one or more active metals are selected from cobalt, molybdenum, nickel and tungsten.

The metals present in the hydropyrolysis catalyst compositions used in the process of the present invention are supported, preferably on a metal oxide support. Metal oxides useful as supports for the hydropyrolysis catalyst composition include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalized fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the hydropyrolysis catalyst compositions are preferably in the range of from 0.05 wt % to 2 wt % for noble metals (e.g. ruthenium, platinum, palladium and iridium) and from 1 wt % to 75 wt % for base metals (e.g. cobalt, molybdenum, nickel, tungsten and iron) (weight percentages are expressed as a weight percentage of total of all active metals on the calcined catalyst in their reduced (metallic) form).

Additional elements such as one or more of phosphorous, boron and nickel may be incorporated into the catalyst to improve the dispersion of the active metal.

The hydropyrolysis catalyst compositions used in the process of the present invention may be prepared by any suitable method known in the art. Suitable methods include, but are not limited to co-precipitation of the active metals and the support from a solution; homogeneous deposition precipitation of the active metals on the support; pore volume impregnation of the support with a solution of the active metals; sequential and multiple pore volume impregnations of the support by a solution of the active metals, with a drying or calcination step carried out between successive pore volume impregnations; co-mulling of the support with a solution or a powder containing the active metals. Further, a combination of two or more of these methods may also be used.

Of these methods, preferable methods for obtaining higher (greater than or equal to 40 wt %) metal loadings on the support include co-precipitation of the active metals and the support from a solution; sequential and multiple pore volume impregnations of the support by a solution of the active metals, with a drying or calcination step carried out between successive pore volume impregnations; co-mulling of the support with a solution or a powder containing the active metals; and combinations of two or more of these methods.

After preparation by one of these or another method, the compositions thus-formed are suitably subjected to a sulfidation step in order to convert at least a portion of the active metals into their sulfided form. This can be carried out by subjecting the catalyst to a sulfur-containing fluid at elevated temperatures and pressures. Typical sulfur containing fluids include liquid hydrocarbons containing sulfur dopants or sulfur compounds occurring naturally in the hydrocarbons, and gaseous streams containing hydrogen sulfide. Typical pressures for sulfidation step range from 0.5 MPa to 10 MPa, while typical temperatures range from 150° C. to 450° C.

Alternatively, a catalyst that has been previously used in a hydropyrolysis or other hydroprocessing process such that the resultant 'spent' catalyst comprises active metals that are present in a partially sulfided form to the extent that the catalyst composition contains sulfur in an amount of from 10 to 90% of a full stoichiometric amount may be used as the first hydropyrolysis catalyst composition.

It will be readily apparent that, although the hydropyrolysis catalyst composition provided in the first hydropyrolysis reactor will initially comprise metals in their partially sulfided state, the chemical form of the catalyst composition will undergo a change under the operating environment of the process, resulting in a change in the chemical form of the active metals on the catalyst and of the support as well. This change will involve phenomena resulting from the interaction of the catalyst with the reactant gas (hydrogen), products (hydrocarbons) and byproducts (water, carbon monoxide, carbon dioxide, ammonia, hydrogen sulfide et cetera) under the temperature and pressure conditions of the process.

It is postulated, without wishing to be bound by theory, that the initial chemical composition will be transformed under the conditions of the process of the invention into a composition where a portion of the active metals may be in reduced form (with an oxidation number of zero), another portion of the active metals may be in a higher oxidation state in sulfided form (forming a chemical bond with sulfur atoms present in the biomass feedstock) and yet another portion of the active metals may be in a higher oxidation state in oxidic form (with oxygen atoms available from the biomass feedstock or from the catalyst itself).

Further catalyst may be added to the process as it progresses in order to replace catalyst lost through attrition. Such catalyst will also be initially provided to the first hydropyrolysis reactor vessel in the same partially sulfided form as the first hydropyrolysis catalyst composition.

Catalyst particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

In the inventive process, solid biomass feedstock and molecular hydrogen are introduced into the hydropyrolysis reactor vessel containing the hydropyrolysis catalyst composition, in which vessel the biomass undergoes hydropyrolysis, producing an output comprising char, partially deoxygenated products of biomass hydropyrolysis liquid product, light gases ($C_1$-$C_3$ gases, $H_2O$, $CO$, $CO_2$, and $H_2$) and catalyst fines. Although any type of reactor suitable for hydropyrolysis may be employed, the preferred type of reactor is a bubbling fluidized bed reactor. The fluidization velocity, catalyst size and bulk density and biomass size and bulk density are chosen such that the catalyst remains in the bubbling fluidized bed, while the char produced gets entrained out of the reactor. The hydropyrolysis step employs a rapid heat up of the biomass feed such that the residence time of the pyrolysis vapours in the reactor vessel is preferably less than about 1 minute, more preferably less than 30 seconds and most preferably less than 10 seconds.

The solid biomass feedstock used in the inventive process contains any combination of solid feedstocks containing waste plastics, feedstocks containing lignocellulose and municipal solid waste containing lignocellulosic material, waste plastics or food waste. Lignocellulosic material comprises a mixture of lignin, cellulose and hemicelluloses in any proportion and usually also contains ash and moisture.

Suitable lignocellulose-containing biomass includes woody biomass and agricultural and forestry products and residues (whole harvest energy crops, round wood, forest slash, bamboo, sawdust, bagasse, sugarcane tops and trash, cotton stalks, corn stover, corn cobs, castor stalks, Jatropha whole harvest, Jatropha trimmings, de-oiled cakes of palm, castor and Jatropha, coconut shells, residues derived from edible nut production and mixtures thereof), and municipal solid wastes containing lignocellulosic material. The municipal solid waste may comprise any combination of lignocellulosic material (yard trimmings, pressure-treated wood such as fence posts, plywood), discarded paper and cardboard, food waste, textile waste and waste plastics, along with refractories such as glass, metal. Prior to use in the process of this invention, municipal solid waste may be optionally converted, after removal of at least a portion of any refractories, such as glass or metal, into pellet or briquette form. Such pellets or briquettes are commonly referred to as Refuse Derived Fuel in the industry. Co-processing of MSW with lignocellulosic waste is also envisaged. Certain food waste may be combined with sawdust or other material and, optionally, pellitised prior to use in the process of the invention. Certain feedstocks (such as algae and lemna) may also contain protein and lipids in addition to lignocellulose In a preferred embodiment of the invention, woody biomass, preferably wood, is used as the source of the biomass feedstock.

The biomass feed utilized in the process of this invention may be in the form of loose biomass particles having a majority of particles preferably less than about 3.5 mm in size or in the form of a biomass/liquid slurry. However, it will be appreciated by those skilled in the art that the biomass feed may be pre-treated or otherwise processed in a manner such that larger particle sizes may be accommodated. Suitable means for introducing the biomass feed into the hydropyrolysis reactor vessel include, but are not limited to, an auger, fast-moving (greater than about 5 m/sec) stream of carrier gas (such as inert gases and $H_2$), and constant-displacement pumps, impellers, or turbine pumps. In the most preferred embodiment of the invention, a double-screw system comprising of a slow screw for metering the biomass followed by a fast screw to push the biomass into the reactor without causing torrefaction in the screw housing is used for biomass dosing. An inert gas or hydrogen flow is maintained over the fast screw to further reduce the residence time of the biomass in the fast screw housing.

The hydropyrolysis is carried out in the hydropyrolysis reactor vessel at a temperature in the range of from 350° C. to 600° C. and a pressure in the range of from 0.50 MPa to 7.50 MPa. The heating rate of the biomass is preferably greater than about 100 $W/m^2$. The weight hourly space velocity (WHSV) in g(biomass)/g(catalyst)/hr for this step is suitably in the range of from 0.2 $h^{-1}$ to 10 $h^{-1}$, preferably in the range of from 0.3 $h^{-1}$ to 3 $h^{-1}$.

The hydropyrolysis step of this invention operates at a temperature hotter than is typical of a conventional hydroprocessing processes familiar to those skilled in the state-of-the-art of hydrotreating and hydrocracking of petroleum-derived fractions, as a result of which the biomass is rapidly devolatilized. Thus, the step may include the use of an active catalyst to stabilize the hydropyrolysis vapours, but not so active that it rapidly cokes.

The hydropyrolysis step of the inventive process produces a partially deoxygenated hydropyrolysis product. The term 'partially deoxygenated' is used herein to describe material in which at least 30 wt %, preferably at least 50 wt %, more preferably at least 70 wt % of the oxygen present in the original lignocelluloses-containing biomass has been removed. The extent of oxygen removal here refers to the percentage of the oxygen in the biomass feedstock, excluding that contained in the free moisture in the feedstock. This oxygen is removed in the form of $H_2O$, CO and $CO_2$ in the hydropyrolysis step. Although it is possible that 100 wt % of the oxygen present in the original biomass is removed, typically at most 98 wt %, suitably at most 95 wt % will be removed in the hydropyrolysis step.

In between the hydropyrolysis and hydroconversion steps, char and catalyst fines are removed from the partially deoxygenated hydropyrolysis product. Any ash present will also be removed at this stage. The most preferred method of char and catalyst fines removal from the vapour stream is by cyclone separation.

Char may also be removed in accordance with the process of this invention by filtration from the vapour stream, or by way of filtering from a wash step-ebullated bed. Back-pulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilized the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is the high boiling point portion of the finished oil from this process and is thus a fully saturated (hydrogenated), stabilized oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase.

Inert graded bed materials may also be used to remove the char and catalyst fines from the vapour stream.

In accordance with another embodiment of this invention, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the first reaction stage, which is typically less than 200 mesh (smaller than 70 micrometers).

Any ash and catalyst fines present may also be removed in the char removal step.

After removal of the char, the partially deoxygenated hydropyrolysis product together with the $H_2$, CO, $CO_2$, $H_2O$, and $C_1$-$C_3$ gases from the hydropyrolysis step are introduced into a hydroconversion reactor vessel and subjected to a hydroconversion step. The hydroconversion is suitably carried out at a temperature in the range of from 300° C. to 600° C. and a pressure in the range of from 0.50 MPa to 7.50 MPa. The weight hourly space velocity (WHSV) for this step is in the range of about 0.1 $h^{-1}$ to about 2 $h^{-1}$.

The hydroconversion catalyst used in this step is protected from Na, K, Ca, P, and other metals present in the biomass which may otherwise poison the catalyst, since these metals are predominantly removed from the biomass into char and ash in the first hydropyrolysis stage. This catalyst is protected from olefins and free radicals by the upgrading achieved in the first reaction stage step.

Any hydroconversion catalyst suitable for use in the temperature range of this process may be employed in the hydroconversion step.

In one preferred embodiment of the invention, the hydroconversion catalyst is selected from sulfided catalysts comprising one or more metals from the group consisting of nickel, cobalt, molybdenum or tungsten supported on a metal oxide. Suitable metal combinations include sulfided NiMo, sulfided CoMo, sulfided NiW, sulfided CoW and sulfided ternary metal systems comprising any three metals from the family consisting of Ni, Co, Mo and W. Catalysts such as sulfided Mo, sulfided Ni and sulfided W are suitable for use as well.

In another preferred embodiment of the invention, the hydroconversion catalyst comprises one or more active metals selected from cobalt, molybdenum, nickel, tungsten, ruthenium, palladium, platinum, iridium and iron on an oxide support, wherein the active metals are present in a partially sulfided form to the extent that the hydroconversion catalyst contains sulfur in an amount of from 10 to 90% of a full stoichiometric amount.

The hydropyrolysis catalyst composition and the hydroconversion catalyst may be the same or different species.

Metal oxides useful as supports for the hydroconversion catalyst include alumina, silica, titania, ceria, zirconia, as well as binary oxides such as silica-alumina, silica-titania and ceria-zirconia. Preferred supports include alumina, silica and titania. The most preferred support is alumina.

The support may optionally contain regenerated and revitalized fines of spent hydrotreating catalysts (e.g. fines of CoMo on oxidic supports, NiMo on oxidic supports and fines of hydrocracking catalysts containing NiW on a mixture of oxidic carriers and zeolites). Total metal loadings on the catalyst are preferably in the range of from 5 wt % to 35 wt % (expressed as a weight percentage of calcined catalyst in reduced form, e.g. weight percentage of nickel (as Ni) and molybdenum (as Mo) on partially sulfided NiMo on alumina catalyst). Additional elements such as phosphorous may be incorporated into the catalyst to improve the dispersion of the metal. Metals can be introduced on the support by impregnation or co-mulling or a combination of both techniques.

Total metal loadings on the hydroconversion catalyst are preferably in the range of from 0.05 wt % to 2 wt % for noble metals (e.g. ruthenium, platinum, palladium and iridium) and from 1 wt % to 75 wt % for base metals (e.g. cobalt, molybdenum, nickel, tungsten and iron) (weight percentages are expressed as a weight percentage of total of all active metals on the calcined catalyst in their reduced (metallic) form).

Catalyst particles sizes, for use in a commercial reactor in the hydroconversion step, are preferably in the range of from 0.3 mm to 4.0 mm, more preferably in the range of from 0.6 mm to 3.0 mm. Preferably, the hydroconversion catalyst is used in an extruded form, for example cylindrical or as trilobes.

After the hydroconversion step, the vapour phase product of step c) is preferably condensed to provide a liquid phase product comprising substantially fully deoxygenated C4+ hydrocarbon liquid and aqueous material. The remaining vapour phase comprises mainly $H_2$, CO, $CO_2$ and light hydrocarbon gases (typically $C_1$ to $C_3$, but this stream may also contain some $C_4$ and $C_5$ hydrocarbons) and is separated.

This remaining vapour phase may be sent to a gas clean-up system to remove $H_2S$, ammonia and trace amounts of organic sulfur-containing compounds, if present as by-products of the process. The stream containing CO, $CO_2$, $H_2$ and light hydrocarbons may then be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process.

The liquid phase product may then be separated in order to remove the aqueous material, suitably by phase separation, and to provide the substantially fully deoxygenated C4+ hydrocarbon liquid.

The term 'substantially fully deoxygenated' is used herein to describe material in which at least 90 wt %, preferably at least 95 wt %, more preferably at least 99 wt % of the oxygen present in the original lignocellulose containing biomass has been removed. The resulting hydrocarbon liquid contains less than 2 wt %, preferably less than 1 wt %, and most preferably less than 0.1 wt % oxygen.

Suitably, the substantially fully deoxygenated C4+ hydrocarbon liquid is then subjected to further separation and purification steps in order to provide desirable products.

In one embodiment of the invention, the substantially fully deoxygenated C4+ hydrocarbon liquid is subjected to distillation in order to separate the substantially fully deoxygenated C4+ hydrocarbon liquid into fractions according to ranges of the boiling points of the liquid products contained therein. The hydrogenation step may then be applied to all or some of these fractions.

The substantially fully deoxygenated C4+ hydrocarbon liquid comprises naphtha range hydrocarbons, middle distillate range hydrocarbons and vacuum gasoil (VGO) range hydrocarbons, which can be separated by distillation. For the purpose of clarity, middle distillates here are defined as hydrocarbons or oxygenated hydrocarbons recovered by distillation between an atmospheric-equivalent initial boiling point (IBP) and a final boiling point (FBP) measured according to standard ASTM distillation methods. ASTM D86 initial boiling point of middle distillates may vary from 150° C. to 220° C. Final boiling point of middle distillates, according to ASTM D86 distillation, may vary from 350° C. to 380° C. Naphtha is defined as hydrocarbons or oxygenated hydrocarbons having four or more carbon atoms and having an atmospheric-equivalent final boiling point that is greater than 90° C. but less than 200° C. A small amount of hydrocarbons produced in the process (typically less than 10 wt % of total C4+ hydrocarbons, preferably less than 3 wt % of total C4+ hydrocarbons and most preferably less than 1 wt % of total C4+ hydrocarbons) boil at temperatures higher than those for the middle distillates as defined above, i.e. they are hydrocarbons with boiling range similar to vacuum-gas oil produced by distillation of petroleum.

Gasoline is an automotive fuel comprising predominantly of naphtha-range hydrocarbons, used in spark-ignition internal combustion engines. In the United States, ASTM D4814 standard establishes the requirements of gasoline for ground vehicles with spark-ignition internal combustion engines.

Diesel is an automotive fuel comprising predominantly of middle-distillate range hydrocarbons, used in compression-ignition internal combustion engines. In the United States, ASTM D975 standard covers the requirements of several grades of diesel fuel suitable for various types of diesel engines.

An advantage of the present invention is that under suitable operating conditions, the substantially fully deoxygenated C4+ hydrocarbon liquid produced from lignocellulose-containing biomass is substantially fully free from oxygen, sulfur and nitrogen. Preferably, the oxygen content of this product is less than 1.50 wt % and more preferably less than 0.50 wt %, and most preferably less than 0.10 wt %. The sulfur content is preferably less than 100 ppmw, more preferably less than 10 ppmw, and most preferably less than 5 ppmw. The nitrogen content is preferably less than 1000 ppmw, more preferably to less than 100 ppmw and most preferably to less than 10 ppmw.

DETAILED DESCRIPTION OF THE DRAWINGS

FIG. 1 shows an exemplary, but non-limiting, embodiment of the present invention.

Solid biomass feedstock 1 is contacted with a hydrogen-containing gaseous stream 2 in the presence of a hydropyrolysis catalyst composition in hydropyrolysis reactor vessel 3. The product 4 of this reactor is a mixed solid and vapour phase product containing hydrogen, light gases ($C_1$-$C_3$ hydrocarbons, CO, $CO_2$, $H_2S$, ammonia, water vapour), vapours of C4+ hydrocarbons and oxygenated hydrocarbons. Char, ash and catalyst fines are entrained with the vapour phase product. A solid separator 5 separates char, ash and catalyst fines 6 from the vapour phase product 7. The vapour phase product 7 then enters the catalytic hydroconversion reactor 8. This reactor is a fixed bed reactor. The product 9 of this reactor contains light gaseous hydrocarbons (methane, ethane, ethylene, propane, and propylene), naphtha range hydrocarbons, middle-distillate range hydrocarbons, hydrocarbons boiling above 370° C. (based on ASTM D86), hydrogen and by-products of the upgrading reaction such as $H_2O$, $H_2S$, $NH_3$, CO and $CO_2$. The vapours are condensed in one or more condensers followed by gas-liquid separators 10 downstream of the catalytic hydroconversion reactor 8 and a liquid product 19 is recovered.

The non-condensable gases 11 are sent to a gas clean-up system 12, comprising one or more process units, to remove a $H_2S$ stream 13 and ammonia stream 14 as by-products of the process. Organic sulfur containing compounds may be removed in the gas clean-up system as well. The stream containing light hydrocarbons 15 is sent to a separation, reforming and water-gas shift section 16 of the process, where hydrogen 17 is produced from the light gases and renewable $CO_2$ is discharged as a by-product of the process 18. A fuel gas stream may be recovered as a by-product from this section as well.

The liquid product 19 recovered from the condensation and gas-liquid separation system 10 are sent to a product recovery section 20, where the aqueous product 21 is separated from the hydrocarbon liquid product 22. The hydrocarbon liquid product is then sent for distillation 23 to recover gasoline product 24 and a middle-distillate product 25. If desired, kerosene/jet fuel and diesel may be recovered as separate streams from the distillation tower.

The following non-limiting Example serves to illustrate the invention. The Example is carried out in apparatus according to FIG. 1.

EXAMPLE 1

S-4261 catalyst (a cobalt/molybdenum catalyst supported on alumina, commercially available from CRI Catalyst Co) was ground and sieved to a particle size range of 300 μm to 500 μm. The catalyst was subjected to a sulfiding procedure ex-situ in a manner that converted at most about 60% of the molybdenum on the catalyst from its initial oxidic form ($MoO_3$) to a sulfided form ($MoS_2$). The ex-situ partial sulfiding was carried out in a fixed bed reactor. About 160 mL of the crushed and sieved catalyst was loaded into a reactor system having four parallel reactors. Ultra-low sulfur diesel doped with dimethyl disulphide (DMDS) to have about 1 wt % sulfur in the final, doped liquid was used as the sulfiding feed.

The reactors were pressurized with hydrogen to a pressure of about 40 barg. At a temperature of 150° C., the sulfiding feed was introduced into the reactor with a liquid hourly space velocity of 0.3 mL feed per mL catalyst per hour. The hydrogen to oil ratio was maintained at 1000 Nl $H_2$/kg feed. The reactors were then heated to a temperature of about 250° C. and maintained at that temperature for about 14.8 hours. During this time, the catalyst was exposed to only about 60% of the sulfur required to completely sulfide the active metals on the catalyst. Since DMDS decomposes well below 250° C. producing $H_2S$, and the formation of the metal sulfide from metal oxide and $H_2S$ under the temperatures applied is a facile and thermodynamically favourable reaction, the extent of sulfidation of the active metals on the catalyst is expected to be close to 60% as well. The extent of sulphidation here is defined as the number of molybdenum atoms present in +4 oxidation state bonded to sulfur atoms expressed as a percentage of total molybdenum atoms present in the catalyst formulation.

After this hold time, the sulfiding feed was stopped and the reactor was rapidly cooled to ambient temperature. Finally, the diesel present in the catalyst was flushed out with a light-boiling liquid hydrocarbon solvent (typically octane or decane) and then the solvent itself was stripped out of the catalyst by flushing the unit with hydrogen (after raising the temperature to about 200° C. and dropping the pressure to near ambient pressure). It is necessary to remove the traces of hydrocarbons and DMDS from the catalyst before using it for biomass conversion to avoid the interference of these molecules on the mass balance. About 120 g of this catalyst was used as the $1^{st}$ upgrading catalyst in a bubbling fluidized bed reactor 3.

S-4232 catalyst (a cobalt/molybdenum catalyst commercially available from CRI Catalyst Co), was dried and used as the $2^{nd}$ upgrading catalyst in the second, fixed bed reactor 8 in the form of extrudates of 1.3 mm diameter and approximately 3 mm to 6 mm length. About 750 g of S-4232 catalyst was charged in the fixed bed reactor 8. The catalyst used was spent and reused from previous biomass processing tests on the laboratory unit.

The biomass feedstock used was Pine sawdust ground and sieved to a particle size range of 250 μm to 500 μm. The catalyst in the $1^{st}$ bubbling fluidized reactor 3 was fluidized with a stream of hydrogen pre-heated to a temperature of approximately 435° C. After the $1^{st}$ stage catalyst had been fluidized, the biomass was introduced into the reactor and processed in a continuous manner. The rate of processing of biomass was gradually ramped up to the target rate of 3.64 g/min, corresponding to a weight hourly space velocity of the biomass feedstock to the $1^{st}$ stage reactor of approximately 1.65 kg biomass per kg catalyst per hour on a moisture and ash-free basis. The weighted average temperature of the fluidized bed of catalyst was 441° C. over the duration of biomass processing. The biomass feedstock was converted to a mixture of char, ash and vapours in the $1^{st}$ stage. The fluidization velocity was adjusted in such a way that the solid products (char, ash) and the vapour phase products were carried out of the reactor, while the catalyst remained in the reactor. Some catalyst was attrited into fines, and the fines were carried out of the bed as well.

The solid product was separated from the vapour phase product in a filter and the vapours were sent to the $2^{nd}$ stage, fixed bed reactor 8. The average temperature of the $2^{nd}$ stage catalyst was maintained at 407.5° C. The biomass feedstock processing rate was gradually ramped up to the final WHSV to the $2^{nd}$ stage of 0.26 kg biomass per kg catalyst per hour on a moisture and ash-free basis. Operating pressure for both $1^{st}$ and $2^{nd}$ stage was 22.16 barg.

The vapour phase product of $2^{nd}$ stage reactor was cooled in stages to about −43° C. and a two-layer liquid product containing a hydrocarbon layer floating on an aqueous layer was recovered. The hydrocarbon liquid was separated from the aqueous liquid, and was analyzed. The off gas from the process was sent to an online GC, and composition of the gas was analyzed throughout the run. The mass balance and carbon balance of the process was calculated from the mass and analysis of the liquid products and compositional information of the gas product, based on which the yield profile was calculated.

It was found that the hydrocarbon liquid product had a very low oxygen content (below 0.01 wt %), and the aqueous product produced contained only about 0.02 wt % carbon. Thus, complete hydrodeoxygenation of the biomass was achieved producing an oxygen-free hydrocarbon product, and a carbon-free aqueous phase. The total acid number of the hydrocarbon product was found to be very low, <0.05 mg KOH/g.

Figure 2:
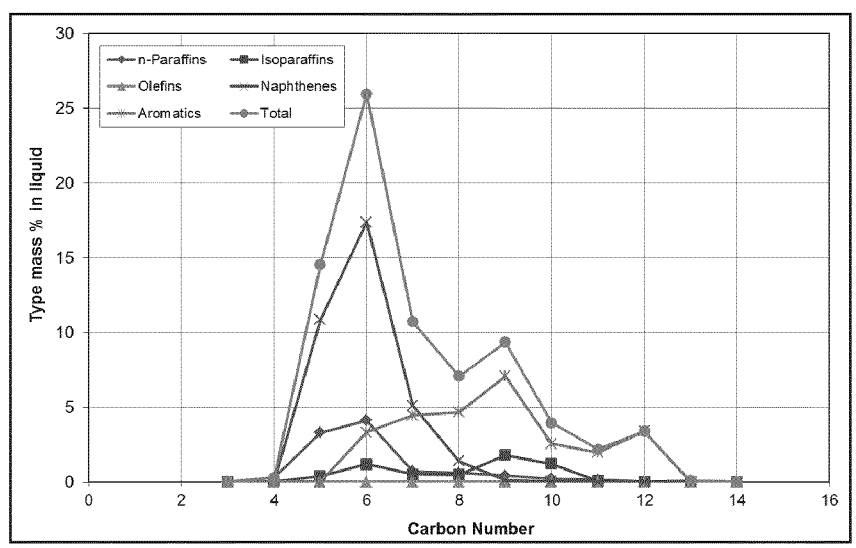
FIG. 2 shows the detailed hydrocarbon analysis (DHA) of the hydrocarbon product of Example 1.
Figure 3:
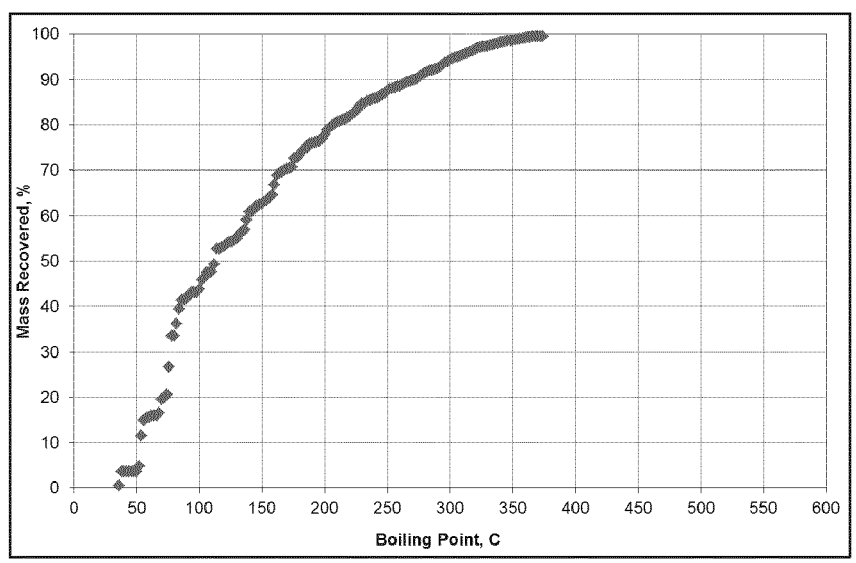
FIG. 3 shows the simulated distillation (SIMDIS) of the hydrocarbon product of Example 1.

The hydrocarbon and aqueous phases were subjected to further analysis. The detailed hydrocarbon analysis (DHA) of the hydrocarbon product (FIG. 2) showed this product to be comprised isoparaffins, naphthenes and aromatics. 6-carbon molecules were the most abundant molecules in the liquid product. SIMDIS of the hydrocarbon product (FIG. 3) showed the product to be boiling predominantly in the gasoline and diesel range, with essentially no heavy hydrocarbons (boiling above 370° C.) produced. The yield of C4+ hydrocarbons (hydrocarbons in the product having 4 or more carbon atoms) in this Example was found to be 25 wt % of the feedstock weight on a moisture and ash-free basis. The yield structure of the other products is mentioned in Table 1.

TABLE 1

| Feedstock Analysis | |
|---|---|
| Moisture, wt %[1] | 9.22 |
| Ash, wt % (dry basis)[2] | 0.44 |
| Elemental Analysis (MAF Basis)[3] | |
| Carbon, wt % | 47.18 |
| Hydrogen, wt % | 6.53 |
| Oxygen, wt % | 46.23 |
| Sulfur, wt % | 0.03 |
| Nitrogen, wt % | 0.03 |
| Feedstock H:C Atomic Ratio | 1.65 |
| Yield Details | |
| Mass Balance Closure (% wof) | 95.7 |
| Carbon balance closure (% wof) | 95.2 |
| C4+ Hydrocarbon Yield (wt %, MAF) | 25.0 |
| C1-C3 Hydrocarbon Yield (wt %, MAF) | 17.7 |
| CO Yield (wt %, MAF) | 1.8 |
| $CO_2$ Yield (wt %, MAF) | 1.0 |
| Char & Ash Yield (wt %, MAF) | 10.3 |
| Water Yield (wt %, MAF) | 41.4 |
| Hydrogen added (wt %, MAF) | 5.56 |
| Condensed Hydrocarbon Liquid Analysis | |
| Oxygen Content (wt %) | BDL[6] |
| Carbon Content (wt %) | 87.67 |
| Hydrogen Content (wt %) | 12.06 |
| Density (g/mL, at 15° C.) | 0.8158 |
| Gasoline[4] in C4+ Hydrocarbon (%) | 78 |
| Diesel[5] in C4+ Hydrocarbon (%) | 23 |
| H/C Atomic Ratio | 1.64 |
| C1-C3 Gas Composition | |
| Methane wt % | 35.8 |
| Ethane wt % | 40.8 |
| Propane wt % | 23.4 |
| Water Analysis | |
| pH | 7.5 |
| Density (g/mL, at 15° C.) | 0.9997 |
| Carbon Content (wt %) | 0.02 |

Notes
[1] Moisture content is estimated from weight loss of the sample after drying at 103 ± 2° C.
[2] Ash content is estimate from the weight loss of the sample after combustion at 575 ± 25° C. and expressed on the basis of the dry weight of the sample
[3] MAF = moisture and ash free basis
[4] Gasoline is defined here as containing hydrocarbons having between 4 and 10 carbon atoms
[5] Diesel is defined here as containing hydrocarbons with 11 or more carbon atoms
[6] BDL = Below detection limit, 0.01 wt % for oxygen analysis That which is claimed is:

1. A process for producing liquid hydrocarbon products from a solid biomass feedstock comprising:
  a) providing in a hydropyrolysis reactor vessel a hydropyrolysis catalyst composition that comprises one or more active metals selected from cobalt, molybdenum, nickel, tungsten, ruthenium, platinum, palladium, iridium and iron on an oxide support, wherein the active metals are present in a partially sulfided form to the extent that the hydropyrolysis catalyst composition contains sulfur in an amount of from 10 to 90% of a full stoichiometric amount;
  b) contacting the solid biomass feedstock with the hydropyrolysis catalyst composition and molecular hydrogen in the hydropyrolysis reactor vessel at a temperature in the range of from 350 to 600° C. and a pressure in the range of from 0.50 to 7.50 MPa, to produce a product stream comprising partially deoxygenated hydropyrolysis product, $H_2O$, $H_2$, $CO_2$, CO, $C_1$-$C_3$ gases, char and catalyst fines;
  c) removing the char and catalyst fines from the product stream;
  d) hydroconverting the partially deoxygenated hydropyrolysis product in a hydroconversion reactor vessel in the presence of one or more hydroconversion catalyst and of the $H_2O$, $CO_2$, CO, $H_2$, and $C_1$-$C_3$ gas generated in step a), to produce a vapour phase product comprising substantially fully deoxygenated hydrocarbon product, $H_2O$, CO, $CO_2$, hydrogen and $C_1$-$C_3$ gases.

2. The process according to claim 1, wherein the active metals are selected from one or more of cobalt, molybdenum, nickel, tungsten, and iron.

3. The process according to claim 1, wherein the hydroconversion catalyst is selected from sulfided catalysts comprising one or more metals from the group consisting of nickel, cobalt, molybdenum or tungsten supported on a metal oxide.

4. The process according to claim 1, wherein the hydroconversion catalyst comprises one or more active metals selected from cobalt, molybdenum, nickel, tungsten, ruthenium, palladium, platinum, iridium and iron on an oxide support, wherein the active metals are present in a partially sulfided form to the extent that the hydroconversion catalyst contains sulfur in an amount of from 10 to 90% of a full stoichiometric amount.

5. The process according to claim 1, wherein the solid biomass feedstock contains any combination of lignocellulosic material.

6. The process according to claim 5, wherein the solid biomass feedstock comprises material selected from one or more of woody biomass and agricultural and forestry products and residues and municipal solid wastes containing lignocellulosic material.

7. The process according to claim 1, further comprising condensing the vapour phase product of step d) to provide a liquid phase product comprising substantially fully deoxygenated C4+ hydrocarbon liquid and aqueous material and separating said liquid phase product from a gas phase product comprising $H_2$, CO, $CO_2$, and $C_1$-$C_3$ gases.

8. The process according to claim 7, wherein the gas phase product comprising $H_2$, CO, $CO_2$, and $C_1$-$C_3$ gases are subjected to a reforming and water-gas shift process in order to produce hydrogen.

9. The process according to claim 8, wherein the gas phase product is first purified to remove any sulfur and $NH_3$ present before being subjected to the reforming and water-gas shift process.

10. The process according to claim 8, wherein the hydrogen produced in the reforming and water-gas shift process is used as at least a portion of the molecular hydrogen in at least one of steps a) and c).

11. The process according to claim 1, wherein the active metals are present in a partially sulfided form to the extent that the hydropyrolysis catalyst composition contains sulfur in an amount of from 30 to 90% of a full stoichiometric amount.

12. The process according to claim 1, wherein the active metals are present in a partially sulfided form to the extent that the hydropyrolysis catalyst composition contains sulfur in an amount of from 50 to 90% of a full stoichiometric amount.

13. The process according to claim 1, wherein the partially deoxygenated hydropyrolysis product is material in which at least 50 wt % of the oxygen present in the solid biomass feedstock has been removed.

14. The process according to claim 1, wherein the partially deoxygenated hydropyrolysis product is material in which at least 70 wt % of the oxygen present in the solid biomass feedstock has been removed.

15. The process according to claim 1, wherein the substantially deoxygenated hydropyrolysis product is material in which at least 95 wt % of the oxygen present in the solid biomass feedstock has been removed.

16. The process according to claim 1, wherein the substantially deoxygenated hydropyrolysis product contains less than 2 wt % oxygen.

17. The process according to claim 1, wherein the substantially deoxygenated hydropyrolysis product contains less than 1 wt % oxygen.

18. The process according to claim 1, wherein the substantially deoxygenated hydropyrolysis product contains less than 0.1 wt % oxygen.

19. The process according to claim 1, wherein the substantially deoxygenated hydropyrolysis product contains less than 100 ppmw sulfur.

20. The process according to claim 1, wherein the substantially deoxygenated hydropyrolysis product contains less than 1000 ppmw nitrogen.

* * * * *